United States Patent [19]

Sihon

[11] Patent Number: 5,397,206
[45] Date of Patent: Mar. 14, 1995

[54] VIBRATION ISOLATING FASTENER

[75] Inventor: Tanas M. Sihon, Monroe, Mich.

[73] Assignee: Chrysler Corporation, Highland Park, Mich.

[21] Appl. No.: 213,281

[22] Filed: Mar. 15, 1994

[51] Int. Cl.$^6$ .................... F16B 33/00; F16B 43/02
[52] U.S. Cl. .................... 411/544; 411/44; 411/542; 411/369; 411/970
[58] Field of Search ............ 411/41, 44, 69, 107, 411/542, 544, 907, 908, 970, 369; 285/162, 196, 338, 49

[56] References Cited

U.S. PATENT DOCUMENTS

| | | | |
|---|---|---|---|
| 1,982,464 | 11/1934 | Buchanan | 285/162 X |
| 2,813,568 | 11/1957 | Kilmarx, Jr. | 411/41 X |
| 2,951,674 | 9/1960 | Rice | 411/907 X |
| 3,272,542 | 9/1966 | Haulik et al. | 411/907 X |
| 3,434,746 | 3/1969 | Watts | 411/41 X |
| 3,953,555 | 4/1976 | Gley | 285/162 X |
| 4,732,519 | 3/1988 | Wagner | 411/107 X |
| 5,094,579 | 3/1992 | Johnson | 411/970 X |

Primary Examiner—Neill R. Wilson
Attorney, Agent, or Firm—Kenneth H. MacLean

[57] ABSTRACT

A multi-part fastener assembly for attaching a first apertured member such as a valve cover to a second member such as a cylinder head, comprising an elongated threaded fastener, a tubular sleeve encircling the threaded fastener, and a rubber grommet encircling the sleeve. The grommet's outer surface is cylindrical for facilitating its insertion through the valve cover's aperture. However, a bead formation created on the grommet's inner surface is engaged upon insertion of the sleeve member through the grommet to cause the lower edge portion of the grommet to be biased radially outward in a manner which secures the sleeve and grommet in the aperture. In addition, the sleeve's upper end portion has a surface extending obliquely to the axis of the sleeve so that when pressed against the grommet by tightening of the fastener the rubber grommet material is distorted outwardly. Further tightening of the fastener seats the lower end of the sleeve member against the associated cylinder head to limit the stress imposed upon the rubber grommet by the sleeve.

2 Claims, 1 Drawing Sheet 5,397,206

VIBRATION ISOLATING FASTENER

BACKGROUND OF THE INVENTION

1. Field of the Invention

This invention relates to a multi-part fastener assembly for attaching a thin walled and apertured member such as a valve cover to another member such as an engine cylinder head so that transmittal of vibratory movements between the members is inhibited. The assembly consists of a threaded fastener, a tubular sleeve with an upper end portion extending radially outward, and an annularly shaped rubber grommet with a lower portion so configured to be easily insertable in the aperture of the valve cover. The aperture can be a simple bore in a thin walled member as opposed to deep socket type apertures required by many fastener assemblies.

2. Description of Related Art

Fastener assemblies designed to attach two members of an engine such as a valve cover to a cylinder head are known. This includes fasteners consisting of a sleeve and a rubber grommet to inhibit transmission of vibration.

In the U.S. Pat. No. 4,732,519 issued to Wagner, a fastener assembly is disclosed including a fastener, a sleeve, and a rubber grommet. The structure provides a flared end of the sleeve to distort the sleeve into a secured position in the aperture which requires chamfered end portions.

In the U.S. Pat. No. 5,094,579 issued to Johnson, a fastener assembly is disclosed including a grommet with a configuration engaged by a portion of the fastener to secure the grommet in an aperture. Also, see the U.S. Pat. No. 5,020,951 issued to Smith which discloses a similar structure.

In the U.S. Pat. No. 4,975,008 issued to Wagner, a fastener assembly is disclosed including a grommet and a sleeve. A structure to secure the grommet and sleeve within the aperture prior to insertion of the fastener is not taught.

In the U.S. Pat. No. 3,869,219 issued to Wilson et al., a fastener assembly is disclosed including a grommet and a fastener with a radially enlarged head portion. There is no provision to secure the grommet into an aperture.

Other patents which disclose fastener assemblies are U.S. Pat. Nos. 4,621,961 to Gulistan; 4,348,140 to Bergholtz et al.; 4,238,165 to Wagner; 4,193,434 to Wagner; 3,502,130 to Gulistan; and 4,334,599 to Ritsema et al.

After reading the following detailed description of this application, it will be appreciated that specific features of the subject fastener assembly are not disclosed in this prior reference or any other prior art known to the applicant.

SUMMARY OF THE INVENTION

This invention is directed to a new and improved multi-piece fastener particularly adapted for attaching engine parts together so that vibratory movements therebetween are inhibited. The fastener assembly includes a specific grommet configuration creating a smooth and cylindrical outer surface for easy insertive movement into an aperture of say a valve cover and a beaded formation on the adjacent inner surface of the grommet to coact with the inserted end of an associated sleeve member to lock the grommet and sleeve in the aperture.

Also, the subject fastener assembly provides a positive torque limiting mechanism for the fastener to provide only a desired compression against the rubber grommet.

Other features and advantages will become more apparent from the following:

DETAILED DESCRIPTION OF AN EMBODIMENT

Figure 3:
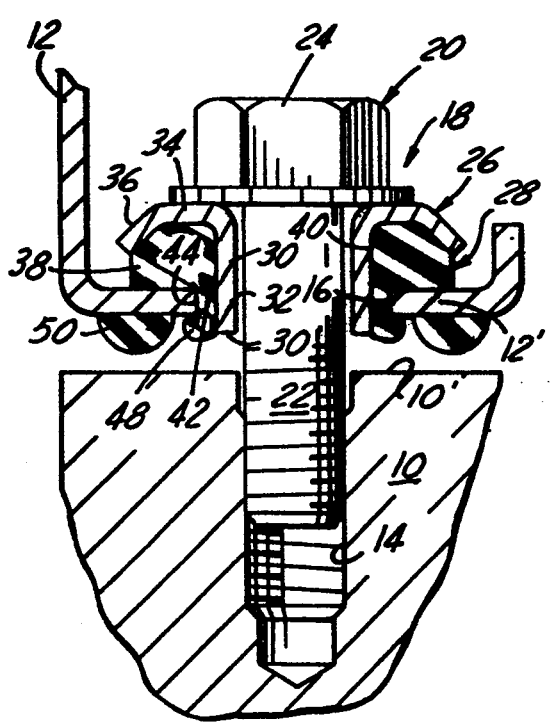
FIG. 3 is a partial side elevational view of a valve cover at the beginning of its attachment to the cylinder head by the subject fastener assembly with the fastener only lightly threadably attached to the cylinder head.
Figure 4:
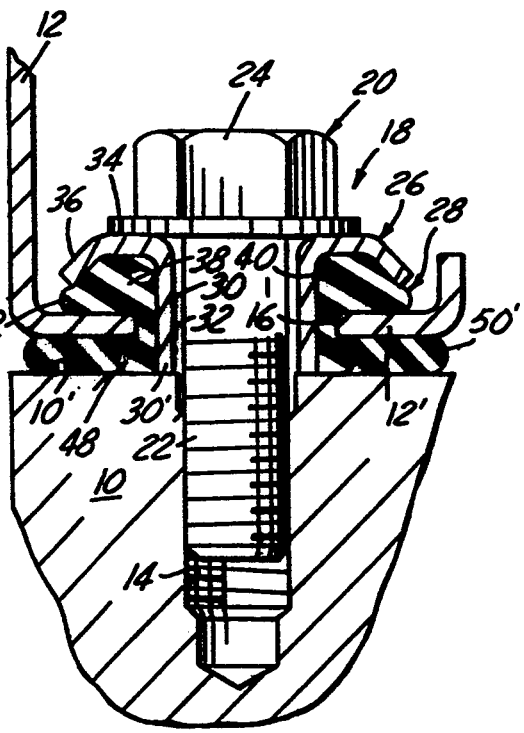
FIG. 4 is a similar view as in FIG. 3 but after the valve cover has been fully attached to the cylinder head by the subject fastener assembly with the fastener fully threaded into the cylinder head.

Views of part of a cylinder head 10 of an internal combustion engine and of part of a valve cover 12 are shown in FIGS. 3 and 4. Cylinder head 10 has a threaded bore 14 adapted to receive a similarly threaded fastener to be identified and discussed hereinafter. Valve cover 12 has an aperture 16 through an edge portion 12' for receiving a fastener assembly 18.

It can be understood from FIGS. 3 and 4 that fastener assembly 18 includes and elongated fastener 20 which has a threaded shank portion 22 and an enlarged head portion 24. The shank portion 22 is adapted to be threadably inserted into the threaded bore 14 which causes head portion 24 to be moved downward toward cylinder head 10.

Figure 1:
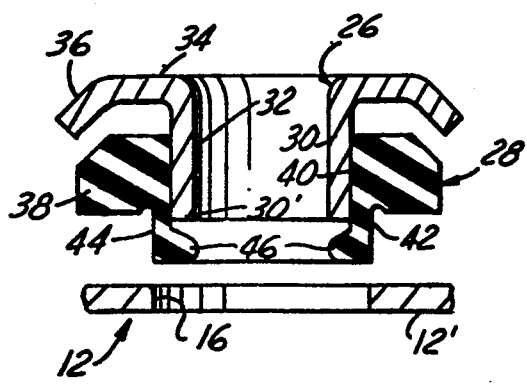
FIG. 1 is a pre-assembly elevational sectioned view of the sleeve and grommet adjacent a portion of the apertured valve cover.
Figure 2:
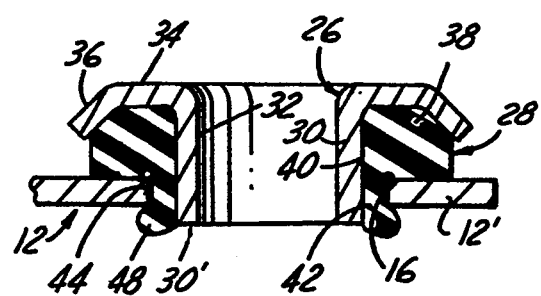
FIG. 2 is a similar view as in FIG. 1 but after the grommet and sleeve have been inserted and locked into the aperture of the valve cover.

As best seen in FIGS. 1 and 2, the fastener assembly 18 includes a sleeve member 26 and a rubber grommet member 28. Sleeve 26 has a generally tubular body portion 30 defining a central opening 32 which has a diameter slightly larger than the diameter of the shank portion 22 to permit easy insertion of fastener 20. The sleeve 26 also has an upper end with a radially outwardly extending portion 34 and an obliquely projecting portion 36.

The grommet member 28 has an annularly shaped body portion 38 with a upper surface configured to correspond with the shape of the upper end of the sleeve 26. The grommet 28 has a central opening 40 dimensioned so that the outer surface 30' of sleeve body 30 can be inserted into the grommet. As best seen in FIG. 1, the grommet 28 has a tubular, thin-walled lower portion 42. This lower portion 42 has a smooth, cylindrical outer wall 44 which is sized to allow ready insertion of the grommet into the aperture 16. Unlike the smooth outer surface 44, a generally half-rounded bead 46 is formed integral with the end portion 42 for the purpose detailed in the next paragraph.

Note that the grommet 28 and partially inserted sleeve 26 shown in FIG. 1 are in a position for insertive assembly into aperture 16. The grommet has been inserted into the aperture 16 in FIG. 2. In addition, the sleeve 26 has been fully inserted into the grommet 28 so that the end portions 34, 36 contact the upper surface of the grommet. As the sleeve is so inserted, the lower end portion 30' of the sleeve contacts the bead 46 and distorts the end portion radially outward to form a bulge 48 which effectively locks the sleeve and grommet subassembly to the valve cover 12. Thus, even when the fastener is removed and the valve cover is separated from the cylinder head 10, the combination grommet and sleeve stay with the valve cover.

Referring again to FIG. 3, the fastener assembly is shown in a position at the start of the attachment process. Beads 50 of sealant are applied to the underside of the valve cover edge as is conventional in the engine assembly art. The fastener 20 is partially threaded into the threaded bore 14. As the fastener 20 is rotated and thus moves into the bore 14, the head portion 24 moves against the upper surface of the portion 34 of sleeve 26. The main body portion 38 of the grommet member 28 is pressed against between the valve cover edge 12' and the portions 34, 36 of the sleeve. Rubber is displaced and moves to the gap between the end portion 36 and the valve cover edge 12' evidenced by bulge 52. Also, any small gaps between the members 12', 26, and 28 are filled.

The length dimension (axial) of sleeve portion 30 is designed so that the sleeve's lower end 30' engages the cylinder head 10 once a desired force is applied to the grommet 28 as shown in FIG. 4. Concurrently, the sealant bead 50 between the valve cover edge 12' and the surface 10' of the cylinder head is flattened to the configuration shown in FIG. 4 which effectively supports the valve cover on the cylinder head 10 and seals the gap therebetween.

The subject fastener assembly is designed so that the sleeve and grommet combination is effectively locked to the valve cover in a pre-assembly step where the two pieces remain even after a fastener is removed as in disassembly. Also, the obliquely oriented upper end of the sleeve is designed to smoothly and effectively direct the flow of rubber toward the gap between the valve cover and the sleeve as the grommet is subjected to the force created by tightening the fastener.

While a preferred embodiment of the subject fastener assembly has been illustrated and described, other embodiments will now become apparent to those skilled in the art and thus the invention is not necessarily limited to what is illustrated and described but by the following claims.

What is claimed is:

1. An assembly adapted for attaching a first member having an aperture therethrough to a second member having a threaded opening therein, comprising: an elongated fastener member with a threaded shank portion adapted to threadably engage the threaded opening in the second member, the fastener member further having an enlarged head portion; a sleeve member having a generally tubular body portion defining an opening to receive said shank portion of said fastener, the sleeve member further having a radially outwardly extending portion at an upper end adjacent said head portion of said fastener; an annularly shaped, resilient grommet member with a thin-walled tubular end portion, the grommet member having a central opening therethrough for insertion of said tubular body portion of said sleeve member whereby said thin-walled end portion has a cylindrical outer surface which allows easy insertion into the first member's aperture; said grommet member having an annular bead formed to project radially inwardly into said central opening whereby insertion of said sleeve's tubular body portion into said grommet's central opening causes radially outward distortion of the end of said grommet's tubular portion thereby locking said grommet and said sleeve into the first member's aperture; said upper end portion being provided with an obliquely extending edge portion adjacent the radially outwardly extending portion whereby when said portion presses against said grommet member, the flow of said resilient grommet material is both radially outward and axially downward against the surface of the first member.

2. A vibration transmission inhibiting type fastener assembly adapted for attaching a first apertured member to a second member having a threaded opening therein, comprising: a fastener member having an enlarged head portion at one end and an elongated, threaded shank portion extending from said head portion whereby the threaded portion is adapted to engage the threaded opening of the second member; a sleeve member with a generally tubular body portion having an opening therethrough for receiving said shank portion of said fastener member, the sleeve member also having a radially and outwardly extending upper end portion adapted to be engaged by said head portion of said fastener member; a generally annularly shaped grommet of elastic material defining a central opening therethrough for insertion of said tubular body portion of said sleeve, said grommet further having a thin-walled lower end portion with a cylindrical outer surface which allows for easy insertion of said lower end portion into the first member's aperture; said grommet having an integrally formed annular bead portion which projects radially inwardly into said central opening whereby subsequent to insertion of said thin walled end portion in the aperture, insertion of said tubular portion of said sleeve into the grommet's central opening produces a radially outward distortion of said thin walled end portion which locks said grommet and sleeve in the aperture; said upper end portion is provided with an obliquely extending edge portion adjacent the radially outwardly extending portion whereby when pressing against said grommet member, the flow of said elastic grommet material is both radially outward and axially downward against the surface of the first member.

* * * * *